(12) United States Patent
Finkenrath et al.

(10) Patent No.: US 8,459,030 B2
(45) Date of Patent: Jun. 11, 2013

(54) HEAT ENGINE AND METHOD FOR OPERATING THE SAME

(75) Inventors: Matthias Finkenrath, Munich (DE); Gabor Ast, Garching (DE); Michael Adam Bartlett, Hägersten (SE); Vittorio Tola, Monserrato (IT)

(73) Assignee: General Electric Company, Niskayuna, NY (US)

( * ) Notice: Subject to any disclaimer, the term of this patent is extended or adjusted under 35 U.S.C. 154(b) by 836 days.

(21) Appl. No.: 12/571,025

(22) Filed: Sep. 30, 2009

(65) Prior Publication Data

US 2011/0072820 A1  Mar. 31, 2011

(51) Int. Cl.
| | |
|---|---|
| F01K 13/00 | (2006.01) |
| F01K 25/08 | (2006.01) |
| F01K 25/00 | (2006.01) |
| F01K 23/04 | (2006.01) |
| B01D 47/00 | (2006.01) |
| B01D 53/56 | (2006.01) |

(52) U.S. Cl.
USPC ............ 60/645; 60/651; 60/671; 60/655; 95/187

(58) Field of Classification Search
USPC ..................... 60/39.52, 645–681
See application file for complete search history.

(56) References Cited

U.S. PATENT DOCUMENTS

| | | | |
|---|---|---|---|
| 3,307,350 A | | 3/1967 | Squires |
| 4,152,217 A | * | 5/1979 | Eisenberg et al. ............ 203/2 |
| 4,537,032 A | | 8/1985 | Kaplan |
| 5,799,490 A | * | 9/1998 | Bronicki et al. ............ 60/655 |
| 5,832,712 A | | 11/1998 | Ronning et al. |
| 6,539,723 B2 | * | 4/2003 | Bronicki et al. ............ 60/774 |
| 6,596,248 B2 | | 7/2003 | Schimkat et al. |

(Continued)

FOREIGN PATENT DOCUMENTS

| | | |
|---|---|---|
| DE | 102008020414 A1 | 10/2009 |
| WO | WO 2009035340 A1 * | 3/2009 |
| WO | 2009112518 A1 | 9/2009 |
| WO | 2011003892 A2 | 1/2011 |

OTHER PUBLICATIONS

Taghaddosi, "Thermodynamic Modeling for Combined ORC (Organic Rankine Cycle) and Single-Flash Geothermal Power Plants", Proceedings World Geothermal Congress 2005, Antalya, Turkey, pp. 24-20, Apr. 2005.

(Continued)

*Primary Examiner* — Kenneth Bomberg
*Assistant Examiner* — Christopher Jetton
(74) *Attorney, Agent, or Firm* — John P. Darling

(57) ABSTRACT

A process fluid cooler can extract thermal energy from a process fluid including carbon dioxide. An absorber can transfer carbon dioxide from the process fluid to a removal fluid. A reboiler can heat the removal fluid so as to cause carbon dioxide to be released from the removal fluid and outputted as part of a reboiler output stream. The reboiler can also output a heating fluid. A stripper condenser can extract thermal energy from the reboiler output stream so as to cause condensation of water associated with the reboiler output stream and to remove carbon dioxide therefrom. A compression system can remove thermal energy from carbon dioxide received from the stripper condenser. A heat engine can be configured to operate according to an organic Rankine cycle, receiving thermal energy from the heating fluid and/or extracted at the process fluid cooler, at the stripper condenser, and/or at the compression system.

19 Claims, 7 Drawing Sheets

U.S. PATENT DOCUMENTS

| | | | |
|---|---|---|---|
| 6,832,485 | B2 | 12/2004 | Sugarmen et al. |
| 7,007,474 | B1 | 3/2006 | Ochs et al. |
| 2007/0256559 | A1* | 11/2007 | Chen et al. ............... 95/169 |
| 2008/0104938 | A1 | 5/2008 | Finkenrath et al. |
| 2008/0168772 | A1* | 7/2008 | Radcliff et al. ............ 60/651 |
| 2008/0317651 | A1* | 12/2008 | Hooper et al. ............ 423/230 |
| 2010/0242476 | A1 | 9/2010 | Ast et al. |

OTHER PUBLICATIONS

Thirunavukarasu, "Organic Rankine cycle for Engine Exhaust Heat Recovery", Technology and Solutions Division, Caterpillar, Inc., 4th Annual Advanced Stationary Reciprocating Engines Conference, 14 pages, Sep. 2007.

Quoilin, "Experimental Study and Modeling of a Low Temperature Rankine Cycle for Small Scale Cogeneration", University of Liege, Faculty of Applied Sciences, Aerospace and Mechanical Engineering Department, Thermodynamics Laboratory, Thesis Submitted in Partial Fulfillment of the Requirements for the Degree of Electro-Mechanical Engineer, (Energetic Engineering), 129 pages, May 2007.

Search Report and Written Opinion from corresponding PCT Application No. PCT/US2010/053685 dated Dec. 6, 2011.

* cited by examiner

HEAT ENGINE AND METHOD FOR OPERATING THE SAME

BACKGROUND

Embodiments disclosed herein relate generally to the field of power generation and, more particularly, to a system and method for recovering waste heat from a carbon dioxide removal process.

Carbon dioxide ($CO_2$) emissions from power plants utilizing fossil fuels are increasingly penalized by national and international regulations, such as the Kyoto protocol and the European Union Emission Trading Scheme. With the increasing cost associated with the emission of $CO_2$, the importance of $CO_2$ emission reduction to economical power generation is increasing. However, due to the energy that must be utilized in order to accomplish $CO_2$ emission reduction by conventional methods, overall power plant efficiency is reduced, in some cases by about 10%. Increasing the efficiency of power plants utilizing $CO_2$ emissions reduction technology is therefore of interest.

BRIEF DESCRIPTION

In one aspect, a system, such as a power plant, is provided, the system including a process fluid cooler, a carbon dioxide removal system, a compression system, and a heat engine. The process fluid cooler can be configured to receive a process fluid including carbon dioxide and to extract thermal energy from the process fluid. The carbon dioxide removal system can include an absorber and a stripper. The absorber can be configured to receive the process fluid from the process fluid cooler and to transfer carbon dioxide from the process fluid to a removal fluid (e.g., a solvent, such as amine). The stripper can be configured to receive the removal fluid from the absorber and can include a reboiler and a stripper condenser. The reboiler can be configured to heat the removal fluid (e.g., by receiving steam) so as to cause carbon dioxide to be released from the removal fluid and outputted as part of a reboiler output stream. The reboiler can also output a heating fluid, such as water. The stripper condenser can be configured to extract thermal energy from the reboiler output stream so as to cause condensation of water associated with the reboiler output stream and to remove carbon dioxide therefrom.

The compression system can be configured to receive carbon dioxide from the stripper condenser and to remove thermal energy from the carbon dioxide. The heat engine can be configured to operate according to an organic Rankine cycle and further configured to receive thermal energy from the heating fluid and/or extracted at the process fluid cooler, at the stripper condenser, and/or at the compression system. The heat engine may include a working fluid such as, for example, carbon dioxide, R245fa, and/or butane.

The heat engine may also include a secondary condenser configured to extract thermal energy from a working fluid. A second heat engine can be included and configured to operate according to an organic Rankine cycle, receiving thermal energy extracted at the secondary condenser.

The system may also include a combustion chamber configured for combustion of a fossil fuel so as to produce the process fluid. The combustion chamber may be configured to direct the process fluid to the process fluid cooler. An exhaust gas recirculation system may also be provided. The exhaust gas recirculation system may be configured to recirculate flue gases back to a main combustion zone of the combustion chamber. The exhaust gas recirculation system can include an exhaust gas recirculation cooler configured to extract thermal energy from the recirculated flue gases, and the heat engine can be configured to receive thermal energy from the exhaust gas recirculation cooler.

The system may further include a primary heat engine configured to operate according to a Rankine cycle with water as a working fluid. The primary heat engine may be configured to receive thermal energy from the combustion chamber, and may include a primary condenser configured to extract thermal energy from the working fluid of the primary heat engine. The heat engine can then be configured to receive thermal energy from the primary condenser.

In another aspect, another system is provided. The system can include a process fluid cooler configured to receive a process fluid including carbon dioxide and to extract thermal energy from the process fluid. The system can also include a carbon dioxide removal system including an absorber and a stripper. The absorber can be configured to receive the process fluid from the process fluid cooler and to transfer carbon dioxide from the process fluid to a removal fluid. The stripper can be configured to receive the removal fluid from the absorber. The stripper can include a reboiler configured to heat the removal fluid so as to cause carbon dioxide to be released from the removal fluid and outputted as part of a reboiler output stream. The reboiler may also output a heating fluid. The stripper can also include a stripper condenser configured to extract thermal energy from the reboiler output stream so as to cause condensation of water associated therewith and to remove carbon dioxide therefrom.

The system can further include a compression system configured to receive carbon dioxide from the stripper condenser and to remove thermal energy from the carbon dioxide, and also a first heat engine configured to operate according to an organic Rankine cycle. The first heat engine can include a first condenser configured to extract thermal energy from a first working fluid and a first evaporator configured to receive thermal energy from at least one of the heating fluid or the thermal energy extracted at the process fluid cooler or the stripper condenser or the compression system. A second heat engine can be configured to operate according to an organic Rankine cycle and can include a second working fluid and a second evaporator configured to receive thermal energy from the first condenser and from at least one of the heating fluid or the thermal energy extracted at the process fluid cooler or the stripper condenser or the compression system.

In some embodiments, the first heat engine can include at least one of R245fa or butane as the first working fluid and the second heat engine can include carbon dioxide as the second working fluid. In other embodiments, the first evaporator is configured to receive at least some of the thermal energy extracted at the process fluid cooler and the second evaporator is configured to receive thermal energy from the heating fluid and the thermal energy extracted at the stripper condenser.

In yet another aspect, a method is provided, which method includes receiving a process fluid including carbon dioxide and extracting thermal energy from the process fluid. The process fluid may be produced, for example, by combusting fossil fuel. Carbon dioxide can be transferred from the process fluid to a removal fluid. The removal fluid can be heated so as to cause carbon dioxide to be released from the removal fluid and included as part of a mixture including steam and so as to produce an output stream of a heating fluid. Thermal energy can be extracted from the mixture of carbon dioxide and steam so as to cause condensation of the steam and to remove carbon dioxide therefrom, creating a carbon dioxide gas stream. Thermal energy can be extracted from the carbon dioxide gas stream. A heat engine can be operated according to an organic Rankine cycle, and thermal energy can be provided to the heat engine from the heating fluid and from that extracted from the process fluid and the carbon dioxide gas stream.

In some embodiments, thermal energy may be extracted from an exhaust gas recirculation cooler and provided to the heat engine. In other embodiments, a primary heat engine may be operated according to a Rankine cycle with water as a working fluid, and thermal energy may be provided from the combustion of fossil fuel to the primary heat engine. Thermal energy can be extracted thermal energy from the working fluid of the primary heat engine and provided to the heat engine.

In some embodiments, operating a heat engine according to an organic Rankine cycle can include extracting thermal energy from a working fluid of the heat engine. A second heat engine can be operated according to an organic Rankine cycle, and thermal energy extracted from the working fluid of the heat engine can be provided to the second heat engine. The working fluid of the heat engine can be heated so as to cause evaporation thereof, and a working fluid of the second heat engine can be heated so as to cause evaporation thereof. Thermal energy can be provided to the second heat engine from at least one of the heating fluid or the thermal energy extracted from the process fluid or the carbon dioxide gas stream.

DRAWINGS

These and other features, aspects, and advantages of the embodiments presented herein will become better understood when the following detailed description is read with reference to the accompanying drawings in which like characters represent like parts throughout the drawings, wherein:

FIG. 1 a schematic view of a power plant;

DETAILED DESCRIPTION

Figure 1:
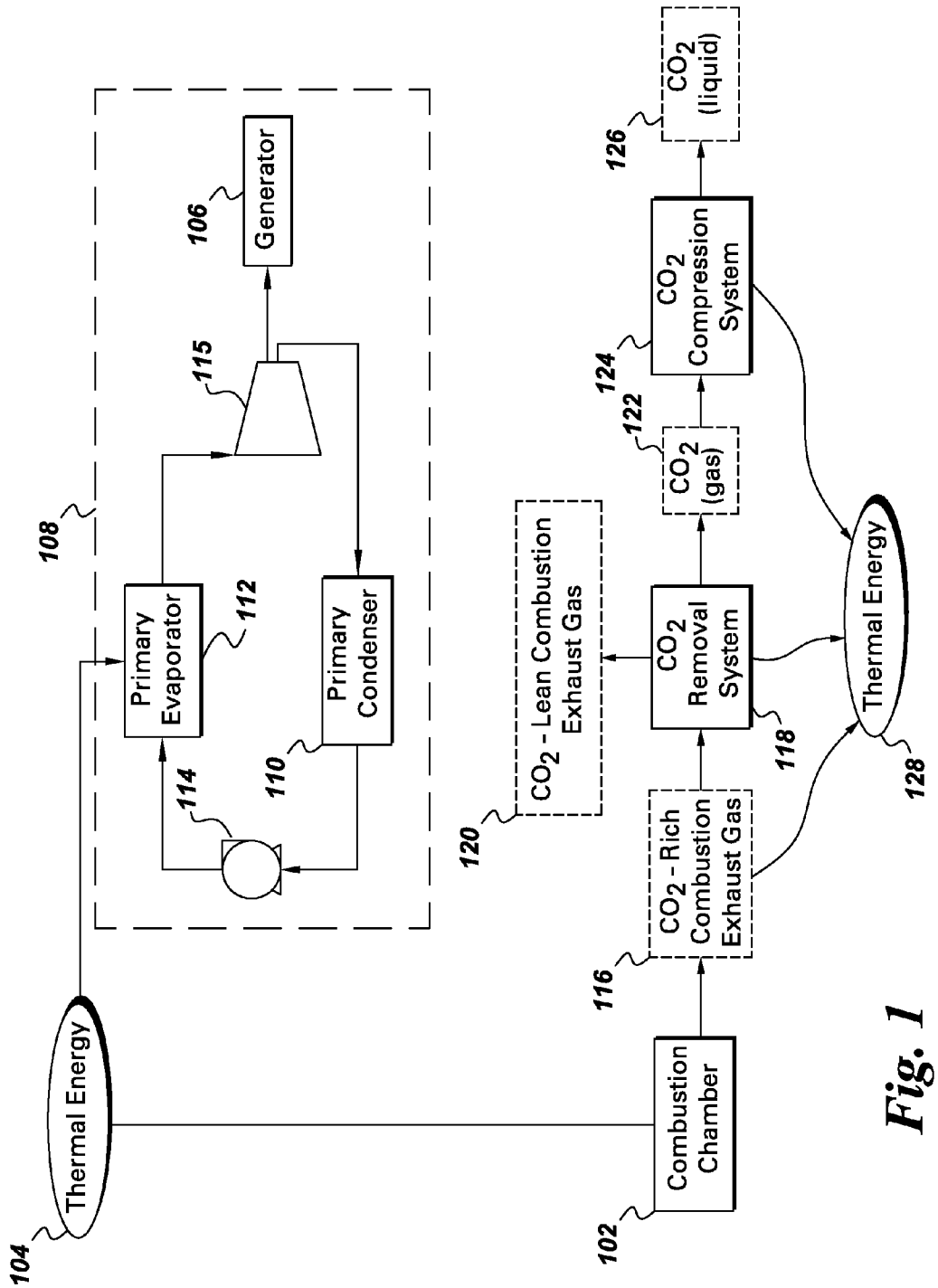

Example embodiments presented herein are described below in detail with reference to the accompanying drawings, where the same reference numerals denote the same parts throughout the drawings. Some of these embodiments may address the above and other needs.

Referring to FIG. 1, therein is shown a schematic view of a system, such as a power plant 100, configured in accordance with an example embodiment. The power plant 100 may include a combustion chamber 102 within which a combustion process takes place. The combustion process may produce thermal energy 104 that can be used to drive a generator 106. For example, the power plant 100 may include a primary heat engine 108 that is configured to operate, say, according to a Rankine cycle, and may, for example, utilize water as the working fluid. The primary heat engine 108 can include a primary condenser 110, a primary evaporator 112, and a pump 114 (e.g., a variable speed pump) that pumps the working fluid from the primary condenser to the primary evaporator. Thermal energy generated by the combustion process taking place in the combustion chamber 102 may then be provided to the primary evaporator 112 as part of the Rankine cycle.

In one embodiment, the primary evaporator 112 may receive thermal energy from the combustion process and generate a working fluid vapor, say, steam. The working fluid vapor can be passed through an expander 115 (e.g., a screw type expander, an axial type expander, an impulse type expander, or a high temperature screw type expander) to drive the generator 106. After passing through the expander 115, the working fluid vapor at a relatively lower pressure and lower temperature is passed through the primary condenser 110. The working fluid vapor is condensed into a liquid, which is then pumped via the pump 114 to the primary evaporator 112. The cycle may then be repeated.

The primary function of the combustion process is to provide thermal energy 104 to the primary heat engine 108. In many cases, fossil fuels, such as, for example, natural gas, coal, methane, and/or liquid petroleum, may act as the fuel in the combustion process occurring in the combustion chamber 102. For example, the power plant 100 may operate according to a natural gas-fuelled combined cycle (NGCC) or a coal-fuelled steam cycle. Where fossil fuel is utilized as the fuel, in addition to thermal energy, the combustion process is expected to produce a $CO_2$-containing process fluid in the form of $CO_2$-rich combustion exhaust gas/products 116.

In order to remove the $CO_2$ from the combustion exhaust gas 116, the exhaust gas can be directed to and received by a $CO_2$ removal system 118. A variety of $CO_2$ removal systems have been developed, as described in Kohl A. L., Nielsen R. B., "Gas Purification" Gulf Publishing Company, Houston, Tex., which is incorporated herein by reference in its entirety. The details of one embodiment of the $CO_2$ removal system 118 are presented below. The $CO_2$ removal system 118, serves to separate much of the $CO_2$ from the aggregate exhaust products 116, thereby resulting in a $CO_2$-lean exhaust gas 120 (which can then be emitted to the atmosphere with more limited environmental impact) and isolated $CO_2$ gas 122 (although the gas may also include relatively small amounts of nitrogen, water, and other compounds). The isolated $CO_2$ can then be directed to a $CO_2$ compression system 124, where the $CO_2$ gas 122 can be compressed to produce liquid $CO_2$ 126 to facilitate storage and subsequent utilization.

At various points in the above described process, thermal energy 128 may be outputted and otherwise unused in the processes associated with the operation of the primary heat engine 108, the $CO_2$ removal system 118, and/or the $CO_2$ compression system 124. For example, upon exiting the combustion chamber 102, the $CO_2$-rich combustion exhaust gas/products 116 are at high temperature due to the combustion process. The temperature of the exhaust gas products 116 is lowered by rejecting the high-grade heat content to the primary heat engine 108, typically to temperatures of about 80° C. for a NGCC-based process and up to 110° C. for a coal fuelled steam cycle-based process. As will be discussed further below, thermal energy is also available from the $CO_2$ removal and compression processes. Because these quantities of thermal energy are not utilized by the processes through which they are produced (i.e., in each case the thermal energy is an output of the process), and would not otherwise be utilized to produce useful work, the thermal energy 128 can be thought of as "waste thermal energy." As will be discussed further below, however, it is to be understood that the "waste" thermal energy from one process may be utilized as part of another process in order to extract useful work.

Figure 2:
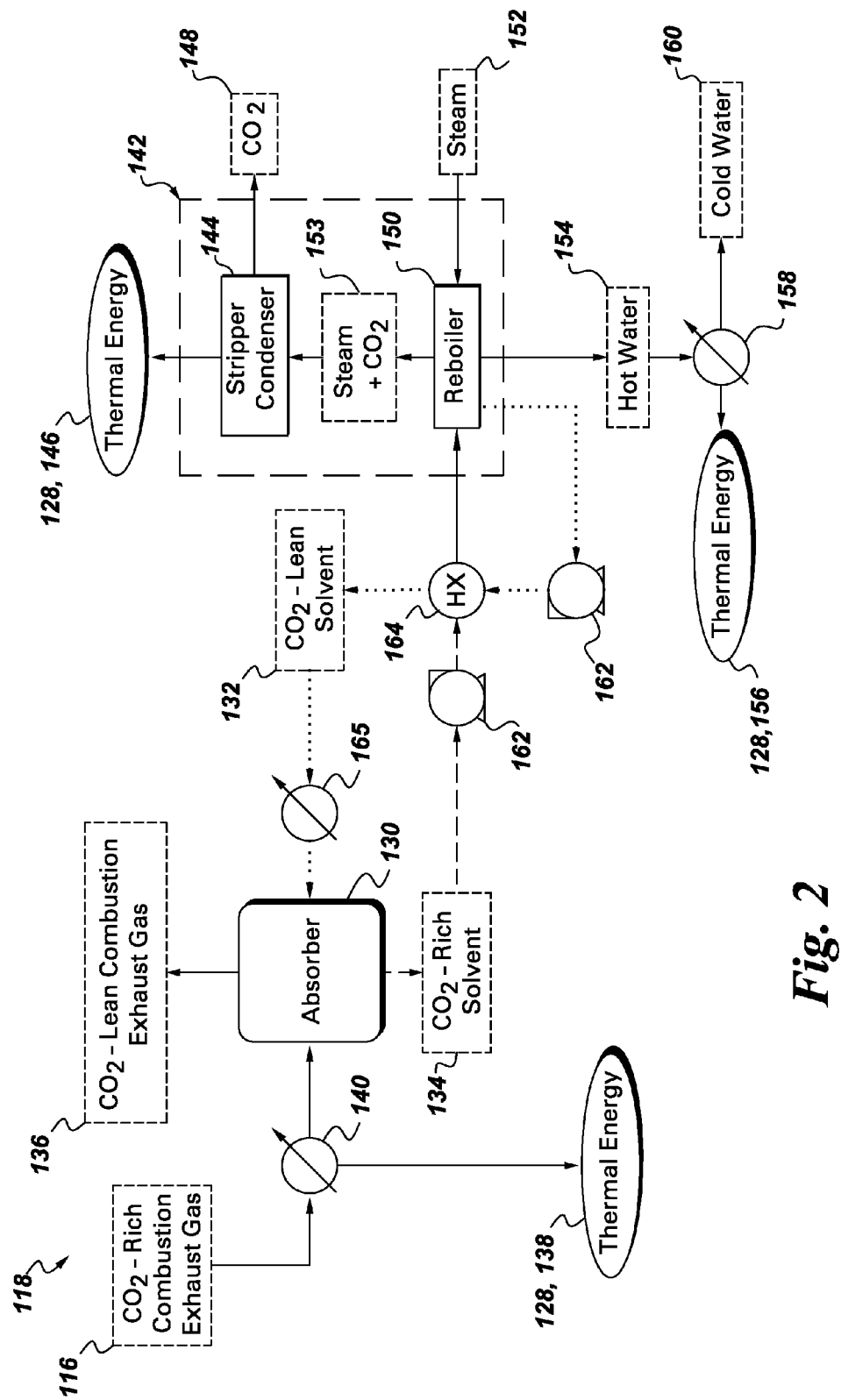
FIG. 2 is a schematic view of a $CO_2$ removal system.

Referring to FIGS. 1 and 2, $CO_2$-rich combustion exhaust gas/products 116 are directed from the combustion chamber 102 to the $CO_2$ removal system 118. A schematic view of an embodiment of the $CO_2$ removal system 118 is provided in FIG. 2. The $CO_2$ removal system 118 can include an absorber 130 configured to receive the $CO_2$-rich combustion exhaust gas 116 and to transfer $CO_2$ from the exhaust gas to a removal fluid. For example, the absorber 130 may be configured to direct the exhaust gas 116 into contact with a stream of solvent 132, such as an amine (e.g., monoethanolamine, diglycolamine, diethanolamine, diisopropanolamine, and/or methyldiethanolamine), that has absorbed therein only a limited amount of $CO_2$ ("$CO_2$-lean solvent"). As the exhaust gas 116 interacts with the $CO_2$-lean solvent 132, $CO_2$ from the exhaust gas is absorbed into and is carried away with the solvent, such that the outputs from the absorber 130 are $CO_2$-rich solvent 134 and $CO_2$-lean combustion exhaust gas 136. As mentioned above, the temperature of the exhaust gas 116 is often relatively high, and thermal energy 138 may be removed from the exhaust gas by a process fluid cooler 140 (e.g., a heat exchanger) in order to cool the exhaust gas prior to being received by the absorber 130.

The $CO_2$ removal system can also include a stripper 142 configured to receive the $CO_2$-rich solvent stream 134 from the absorber 130. The stripper 142 can include a reboiler 150, and the $CO_2$-rich solvent stream 134 can be directed to the reboiler. The reboiler 150 can accept an input stream of heating fluid, such as steam 152, and can be used to heat the $CO_2$-rich solvent stream 134, thereby producing a reboiler output stream, including a mixture of steam and $CO_2$ 153 released from the solvent. The mixture of steam and $CO_2$ 153 that is released from the solvent may be found in the form of an acidic gas. As thermal energy is transferred from the steam 152 to the solvent 132, the steam condenses to form hot water 154. Subsequently, thermal energy 156 can be extracted from the hot water 154 using a heating fluid cooler 158, thereby producing an output stream of cold water 160.

The mixture of steam and $CO_2$ 153 is then directed from the reboiler 150 to a stripper condenser 144, which is configured to extract thermal energy 146 (e.g., via a heat exchanger) from the mixture of steam and $CO_2$ 153 so as to cause condensation of the steam and to correspondingly cause $CO_2$ gas 148 (possibly mixed with relatively small amounts of other compounds, such as about 2.5% water, about 0.1% nitrogen, and trace amounts of argon) to desorb out of the mixture.

Once the $CO_2$ 148 has been removed from the solvent 134, the now $CO_2$-lean solvent 132 is directed back to the absorber 130 to repeat the process. The $CO_2$ removal system 118 may further include one or more pumps 162 that act to move the solvent 132, 134 through the $CO_2$ removal system. Further, a heat exchanger 164 can be included to allow thermal energy to be transferred between the $CO_2$-rich solvent stream 134 and the $CO_2$-lean solvent stream 132. Finally, a further cooler 165 can be included, and configured to remove thermal energy from the $CO_2$-lean solvent stream 132 so as to cool the stream to the operational temperature of the absorber 130.

Figure 3:
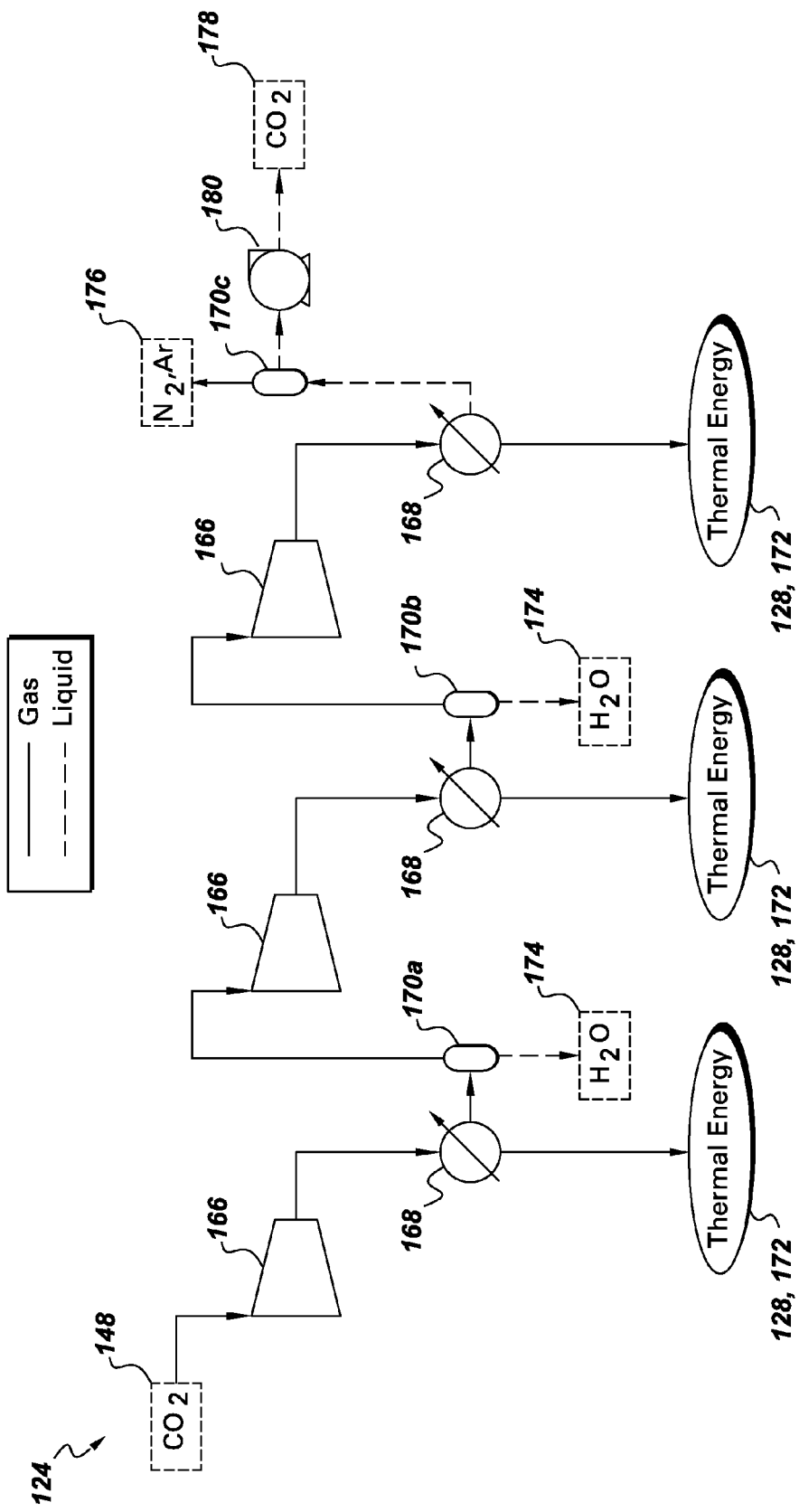
FIG. 3 is a schematic view of a $CO_2$ compression system.
Figure 4:
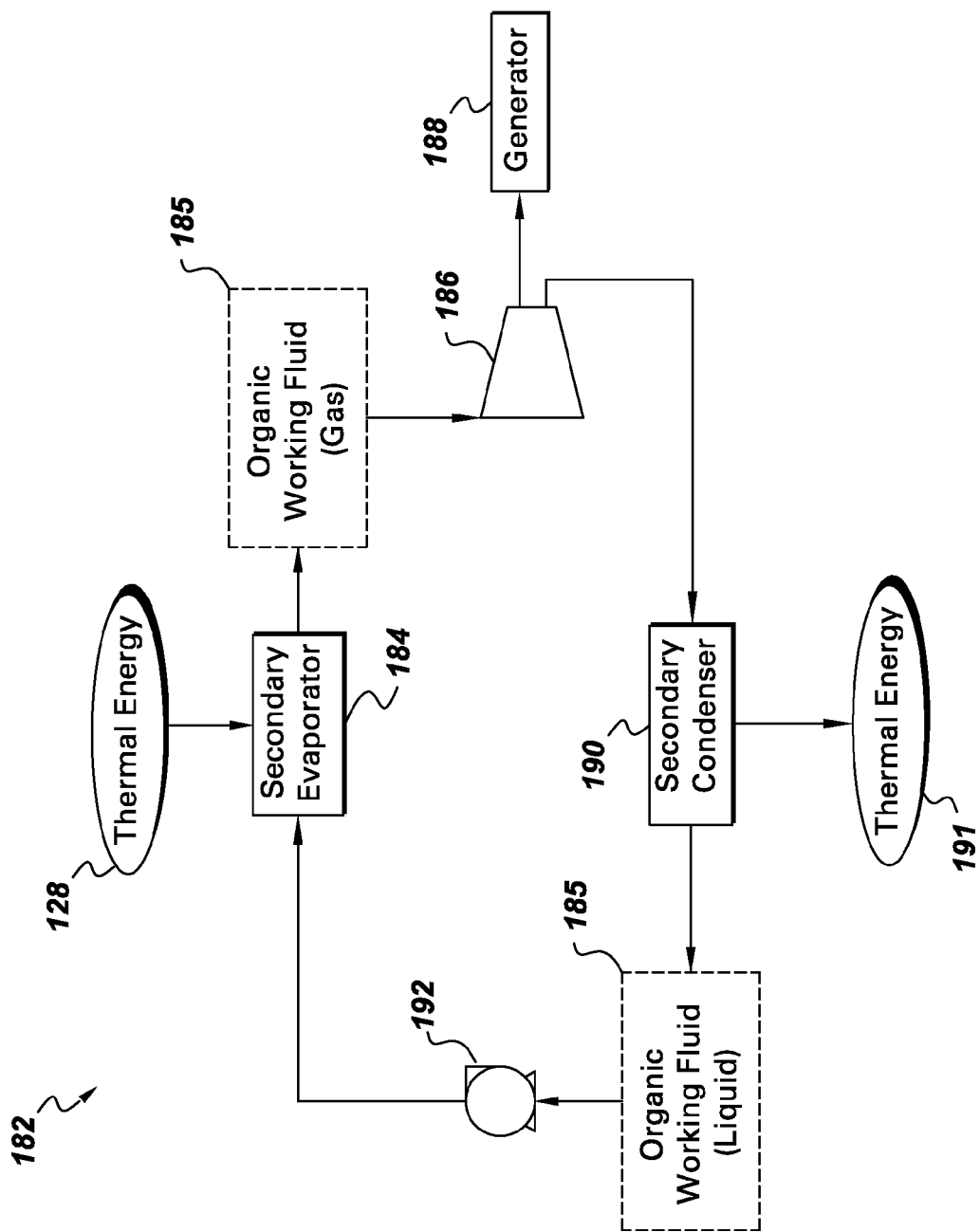
FIG. 4 is a schematic view of a heat engine configured in accordance with an example embodiment.

Referring to FIGS. 1-3, $CO_2$ gas 148 (including relatively small amounts of other compounds) outputted from the $CO_2$ removal system 118 is directed to the $CO_2$ compression system 124 that is configured to remove thermal energy from the $CO_2$ gas. For example, the $CO_2$ gas 148 may be sequentially passed through a series of compressors 166, compression chain intercoolers 168, and dryers 170a-c. For each iteration in which the $CO_2$ gas 148 passes through a compression chain intercooler 168, thermal energy 172 may be extracted. Further, for each iteration in which the $CO_2$ gas 148 passes through a dryer 170, liquid and gaseous products can be separated. In some stages 170a, 170b, water is removed from the $CO_2$ gas 148, while in others, liquefied $CO_2$ is separated from other gaseous impurities 176. Finally, a compressed, and more purified, liquid $CO_2$ 178 can be outputted via a pump 180.

Referring to FIGS. 1-4, the "waste" thermal energy 128 of any single heat source or combination of multiple heat sources may be utilized in conjunction with a heat engine 182. The heat engine 182 can be configured to operate according to an organic Rankine cycle (ORC), where the thermal energy 138, 146, 156, 172 (collectively the thermal energy or "waste" thermal energy 128) from any one or more of the process fluid cooler 140, the stripper condenser 144, the heating fluid cooler 158, and/or the compression chain intercoolers 168, respectively, are received and used to drive the ORC.

The heat engine 182 can include a secondary evaporator 184 configured to receive at least some of the waste thermal energy 128. The secondary evaporator 184 can receive heat from the waste thermal energy 128 and generate a vapor from an organic working fluid 185. The organic working fluid vapor may be passed through an expander 186 to drive a generator unit 188. After passing through the expander 186, the organic working fluid vapor 185, now at a relatively lower pressure and lower temperature, is passed through a secondary condenser 190 that can extract thermal energy 191 from the organic working fluid vapor 185. The organic working fluid vapor is condensed into a liquid, which is then pumped via a pump 192 to the secondary evaporator 184. In one embodiment, the pump 192 may be a variable speed pump, and may supply the condensed organic working fluid 185 to the secondary evaporator 184 at a pressure of 11.3 bars and a temperature of 95° C. The cycle may then be repeated. It should be noted herein that the temperature and pressure values discussed above and in subsequent paragraphs are exemplary values and should not be construed as limiting values. The values may vary depending on the applications.

In certain example embodiments, the organic working fluid 185 may include $CO_2$, cyclohexane, cyclopentane, thiophene, ketones, and/or aromatics. In certain other example embodiments, the organic working fluid 185 may include propane, butane, pentafluoro-propane, pentafluoro-butane, pentafluoro-polyether, oil, R245fa, and/or other refrigerants. It should be noted herein that the above list of organic working fluids is not inclusive, and other organic working fluids applicable to ORCs are also envisaged. In certain other example embodiments, the organic working fluid 185 may include a binary fluid, such as, for example, cyclohexane-propane, cyclohexane-butane, cyclopentane-butane, and/or cyclopentane-pentafluoropropane. In certain example embodiments, the organic working fluid 185 may include a mixture of working fluids and lubrication oil (that is, it may comprise a two-phase mixture).

The above described embodiments may facilitate effective use of waste thermal energy 128 produced through the operation of a $CO_2$ removal and compression process. The waste thermal energy 128 can be converted into electricity via the ORC-based heat engine 182. It is noted that other sources of thermal energy may be available for driving the ORC, including other low-temperature thermal energy sources disposed within the $CO_2$ removal system 118, and/or within the power plant 100 generally. For example, in addition to, or as an alternative to, using one or more of the thermal energy sources 138, 146, 156, 172 (collectively the thermal energy or "waste" thermal energy 128) from the process fluid cooler 140, the stripper condenser 144, the heating fluid cooler 158, and the compression chain intercoolers 168, thermal energy may be extracted from an exhaust gas recirculation (EGR)

cooler (not shown), in which flue gases are recirculated back to the main combustion zone of the combustion process (e.g., in the case of a NGCC-based process, flue gases would typically be directed to the gas turbine compressor inlet), and directed to an ORC-based heat engine 182.

Applicants have discovered that power plant embodiments employing a $CO_2$ removal system and the use of an ORC-based heat engine that draws on the specific thermal energy sources described above are expected to show enhanced efficiency relative to power plant embodiments that attempt to recycle waste thermal energy from other combinations of the multitude of possible thermal energy sources.

Figure 5:
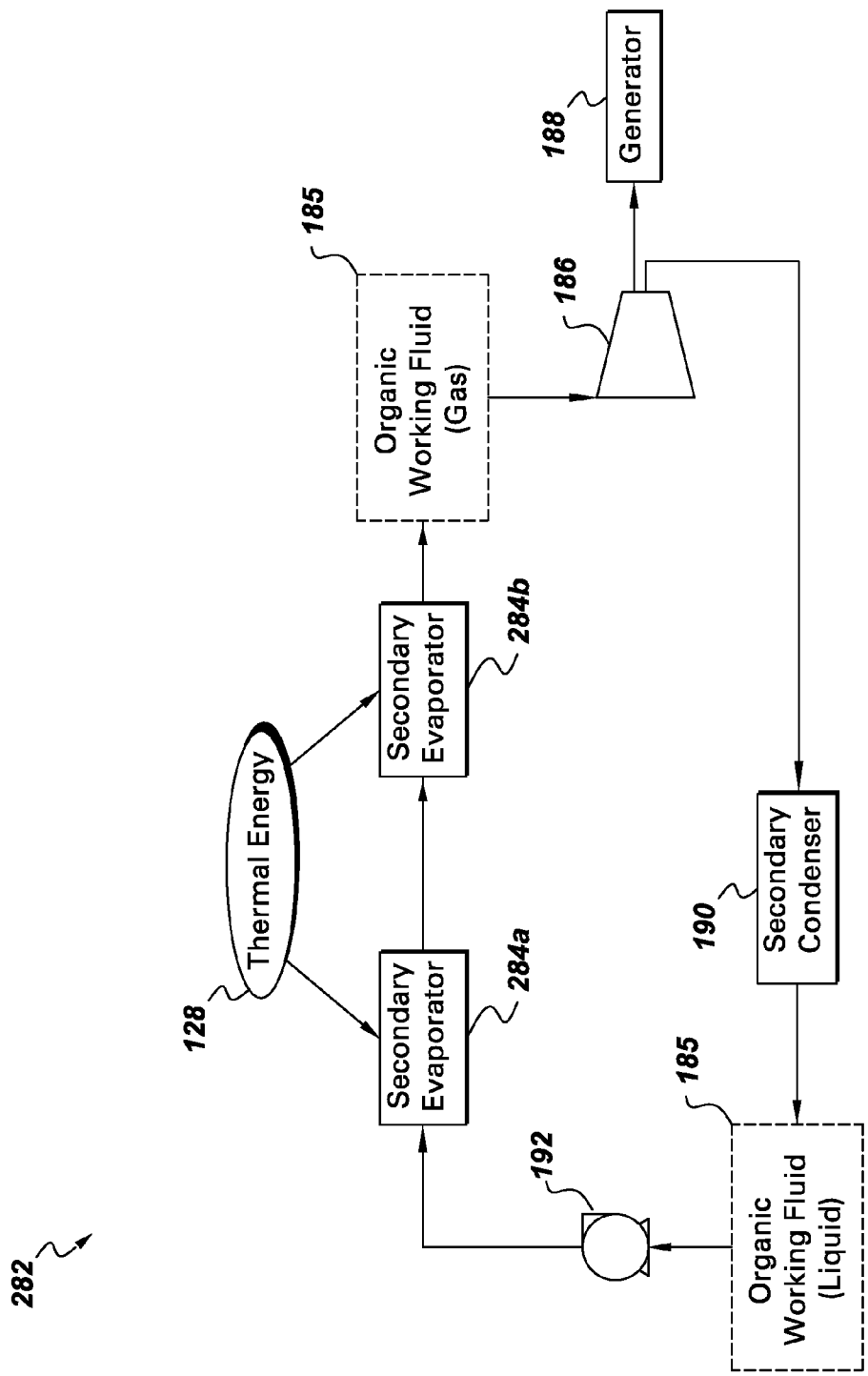
FIGS. 5 and 6 are schematic views of respective heat engines configured in accordance with other example embodiments and respectively including multiple evaporators in varying arrangements.
Figure 6:
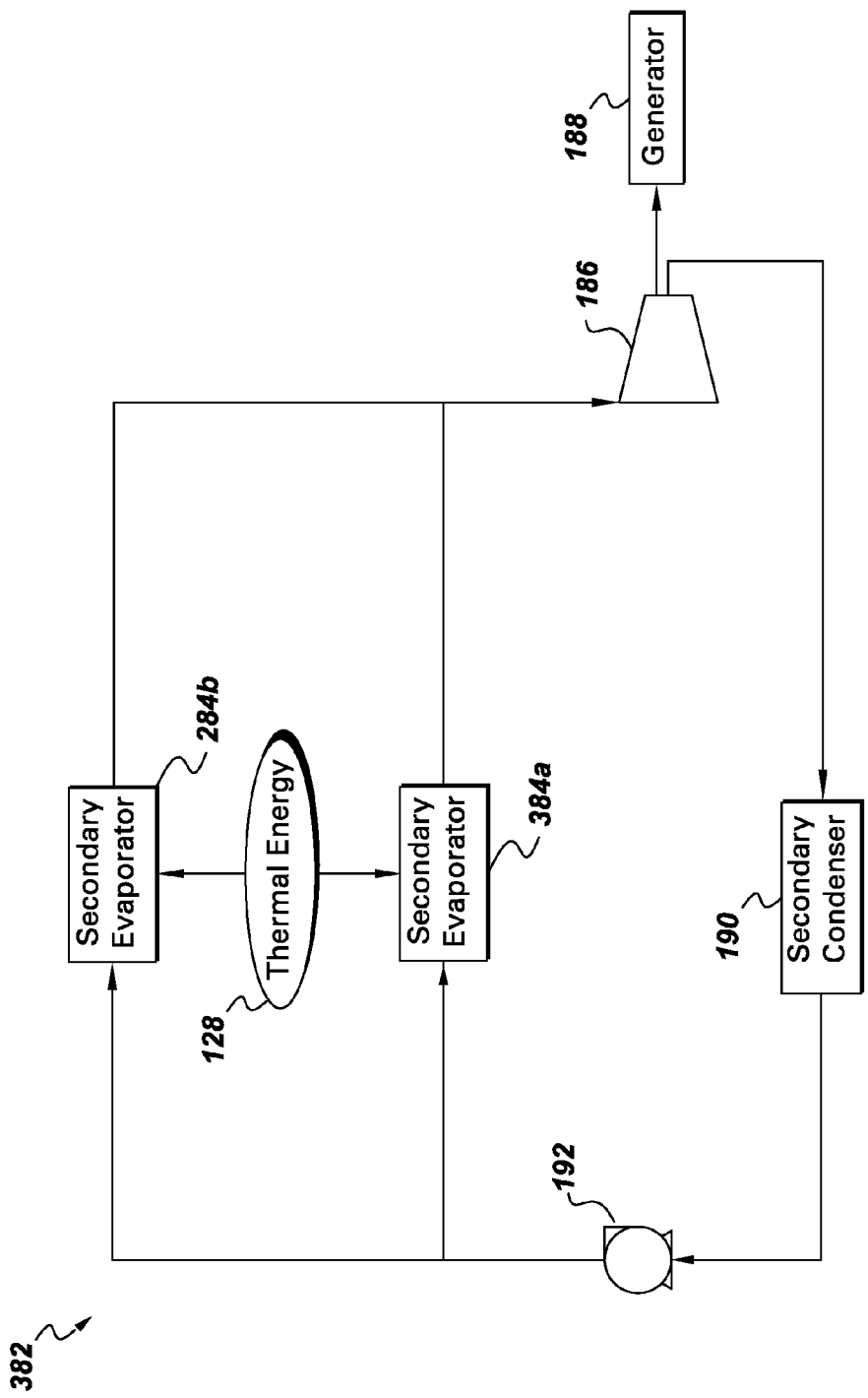
Figure 7:
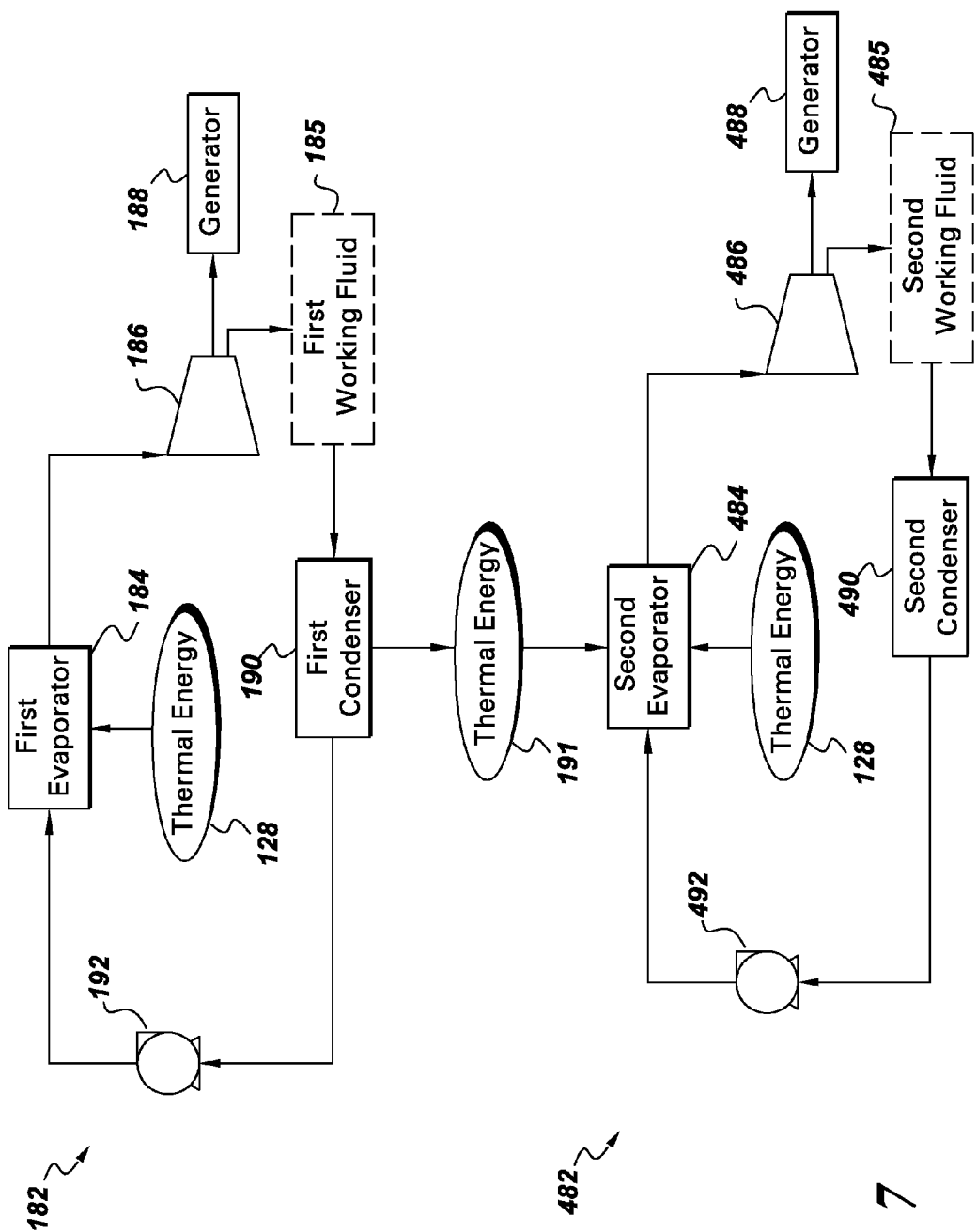
FIG. 7 is a schematic view of heat engines configured in a cascaded arrangement in accordance with an example embodiment.

Referring to FIG. 5, therein is shown a schematic representation of a heat engine 282 configured in accordance with another example embodiment. The heat engine 282 can include multiple secondary evaporators 284a, 284b that are serially arranged. Each of the secondary evaporators 284a, 284b may receive waste thermal energy 128 (FIG. 1) produced through the operation of the $CO_2$ removal and compression process, and may sequentially impart that thermal energy to the organic working fluid 185. Alternatively, referring to FIG. 6, a heat engine 382 can be configured so as to include multiple secondary evaporators 384a, 384b that are arranged in parallel with respect to the flow path of the organic working fluid 185.

Referring to FIGS. 1-4 and 7, the heat engine 182 may be a first heat engine, and may operate in conjunction with a second heat engine 482 that is similarly configured to operate according to an ORC. The first heat engine 182 can include a first condenser 190 configured to extract thermal energy 191 from a first working fluid 185, and can also include a first evaporator 184 configured to receive at least some of the waste thermal energy 128. The second heat engine 482 can include a second condenser 490 configured to extract thermal energy 491 from a second working fluid 485, and can also include a second evaporator 484. In some embodiments, the first condenser 190 and the second evaporator 484 can be replaced by a cascaded heat exchange unit that serves both as a condenser for the first heat engine 182 and as an evaporator for the second heat engine 482.

The second evaporator 484 can be configured to receive at least some of the thermal energy 191 from the first condenser 190 (and from the first organic working fluid 185) and generate a vapor of the second organic working fluid 485. In one example, the second organic working fluid vapor may be at a pressure of 9 bars and temperature of 87° C. The second organic working fluid vapor can be passed through an expander 486 to drive a generator unit 488. In some embodiments, the expanders 186, 486 respectively associated with the first and second heat engines 182, 482 can be coupled to a single generator unit.

The first and second heat engines 182, 482 may utilize working fluids with higher and lower boiling points, respectively. As such, the first and second heat engines 182, 482 may be "cascaded," with the first heat engine 182 may operate thermodynamically as a "top cycle" and the second heat engine 482 may operate as a "bottom cycle." In one embodiment, the first working fluid 185 may include R245fa and/or butane, while the second working fluid can include $CO_2$. In other embodiments, the first working fluid may include cyclohexane, cyclopentane, thiophene, ketones, and/or aromatics, while the second working fluid 485 may include propane, butane, pentafluoro-propane, pentafluoro-butane, pentafluoro-polyether, and/or oil.

In some embodiments, the second evaporator 484 can also be further configured to receive at least some of the waste thermal energy 128. The first evaporator 184 may be configured to receive the thermal energy 138 extracted at the process fluid cooler 140 and the second evaporator 484 may be configured to receive the thermal energy 146, 156, 172 from the heating fluid 152, the stripper condenser 144, and the compression chain intercoolers 168, respectively. In some cases, the thermal energy extracted at the process fluid cooler 140 would be sufficient to have this qualify as a relatively higher grade energy source, while the latter energy sources would be considered relatively lower grade energy sources.

The cascading of the first and second heat engines 182, 482 operating according to ORCs facilitates heat recovery over a temperature range that is too large for a single ORC system to accommodate efficiently. The illustrated embodiments may facilitate effective heat removal from the plurality of lower temperature heat sources. This may increase the effectiveness of the cooling systems and may provide effective conversion of waste heat into electricity.

While only certain features of the invention have been illustrated and described herein, many modifications and changes will occur to those skilled in the art. For example, while much of the above discussion has focused on implementation in the context of a steam cycle plant, it should be clear that the concepts disclosed herein are also applicable in the context of, say, a gas cycle plant, or a pre-combustion $CO_2$ capture configurations where $CO_2$ is being extracted from a synthesis gas flow, and not a combustion exhaust flow. It is, therefore, to be understood that the appended claims are intended to cover all such modifications and changes as fall within the true spirit of the invention.

What is claimed:

1. A system comprising:
a process fluid cooler configured to receive a process fluid including carbon dioxide and to extract thermal energy from the process fluid;
a carbon dioxide removal system including
an absorber configured to receive the process fluid from said process fluid cooler and to transfer carbon dioxide from the process fluid to a removal fluid; and
a stripper configured to receive the removal fluid from said absorber and including
a reboiler configured to heat the removal fluid so as to cause carbon dioxide to be released from the removal fluid and outputted as part of a reboiler output stream, said reboiler outputting a heating fluid; and
a stripper condenser configured to extract thermal energy from the reboiler output stream so as to cause condensation of water associated therewith and to remove carbon dioxide therefrom;
a compression system configured to receive carbon dioxide from said stripper condenser and to remove thermal energy from the carbon dioxide; and
a heat engine configured to operate according to an organic Rankine cycle and further configured to receive thermal energy from at least one of the heating fluid and extracted at said process fluid cooler, at said stripper condenser, and at said compression system.

2. The system of claim 1, wherein said heat engine includes a working fluid selected from the group consisting of carbon dioxide, R245fa, and butane.

3. The system of claim 1, wherein said reboiler is configured to receive steam and to output water as the heating fluid.

4. The system of claim 1, wherein said heat engine includes a secondary condenser configured to extract thermal energy from a working fluid, said system further comprising a second heat engine configured to operate according to an organic Rankine cycle and further configured to receive thermal energy extracted at said secondary condenser.

5. The system of claim 1, further comprising an exhaust gas recirculation system configured to recirculate flue gases back to a main combustion zone of a combustion chamber configured for combustion of a fossil fuel, said exhaust gas recirculation system including an exhaust gas recirculation cooler configured to extract thermal energy from flue gases being recirculated by said exhaust gas recirculation system, wherein said heat engine is configured to receive thermal energy from said exhaust gas recirculation cooler.

6. The system of claim 1, wherein said absorber includes a solvent as the removal fluid.

7. The system of claim 6, wherein said solvent is amine.

8. The system of claim 1, further comprising a combustion chamber configured for combustion of a fossil fuel so as to produce the process fluid, said combustion chamber being further configured to direct the process fluid to said process fluid cooler.

9. The system of claim 8, further comprising a primary heat engine configured to operate according to a Rankine cycle with water as a working fluid and further configured to receive thermal energy from said combustion chamber, said primary heat engine including a primary condenser configured to extract thermal energy from the working fluid of said primary heat engine, and wherein said heat engine is configured to receive thermal energy from said primary condenser.

10. A system comprising:
a process fluid cooler configured to receive a process fluid including carbon dioxide and to extract thermal energy from the process fluid;
a carbon dioxide removal system including
an absorber configured to receive the process fluid from said process fluid cooler and to transfer carbon dioxide from the process fluid to a removal fluid; and
a stripper configured to receive the removal fluid from said absorber and including
a reboiler configured to heat the removal fluid so as to cause carbon dioxide to be released from the removal fluid and outputted as part of a reboiler output stream, said reboiler outputting a heating fluid; and
a stripper condenser configured to extract thermal energy from the reboiler output stream so as to cause condensation of water associated therewith and to remove carbon dioxide therefrom;
a compression system configured to receive carbon dioxide from said stripper condenser and to remove thermal energy from the carbon dioxide;
a first heat engine configured to operate according to an organic Rankine cycle and including a first condenser configured to extract thermal energy from a first working fluid and a first evaporator configured to receive thermal energy from at least one of the heating fluid or the thermal energy extracted at said process fluid cooler or said stripper condenser or said compression system; and
a second heat engine configured to operate according to an organic Rankine cycle and including a second working fluid and a second evaporator configured to receive thermal energy from said first condenser and from at least one of the heating fluid or the thermal energy extracted at said process fluid cooler or said stripper condenser or said compression system.

11. The system of claim 10, wherein said first heat engine includes at least one of R245fa or butane as said first working fluid and said second heat engine includes carbon dioxide as said second working fluid.

12. The system of claim 10, wherein said first evaporator is configured to receive at least some of the thermal energy extracted at said process fluid cooler and said second evaporator is configured to receive thermal energy from the heating fluid and the thermal energy extracted at said stripper condenser.

13. A method comprising:
receiving a process fluid including carbon dioxide;
extracting thermal energy from the process fluid;
transferring carbon dioxide from the process fluid to a removal fluid;
heating the removal fluid so as to cause carbon dioxide to be released from the removal fluid and included as part of a mixture including steam and so as to produce an output stream of a heating fluid;
extracting thermal energy from the mixture of carbon dioxide and steam so as to cause condensation of the steam and to remove carbon dioxide therefrom, creating a carbon dioxide gas stream;
extracting thermal energy from the carbon dioxide gas stream;
operating a heat engine according to an organic Rankine cycle; and
providing thermal energy from the heating fluid and extracted from the process fluid and the carbon dioxide gas stream to the heat engine.

14. The method of claim 13, further comprising extracting thermal energy from an exhaust gas recirculation cooler and providing to the heat engine thermal energy extracted at the exhaust gas recirculation cooler.

15. The method of claim 13, further comprising a combusting a fossil fuel so as to produce the process fluid.

16. The method of claim 13, further comprising:
operating a primary heat engine according to a Rankine cycle with water as a working fluid;
providing thermal energy from said combusting to the primary heat engine;
extracting thermal energy from the working fluid of the primary heat engine; and
providing thermal energy extracted from the working fluid of the primary heat engine to the heat engine.

17. The method of claim 13, wherein said operating a heat engine according to an organic Rankine cycle includes extracting thermal energy from a working fluid of the heat engine, said method further comprising:
operating a second heat engine according to an organic Rankine cycle; and
providing thermal energy extracted from the working fluid of the heat engine to the second heat engine.

18. The method of claim 17, wherein said operating a heat engine according to an organic Rankine cycle includes heating the working fluid of the heat engine so as to cause evaporation thereof, and wherein said operating a second heat engine according to an organic Rankine cycle includes heating a working fluid of the second heat engine so as to cause evaporation thereof.

19. The method of claim 17, further comprising providing thermal energy from at least one of the heating fluid or the thermal energy extracted from the process fluid or the carbon dioxide gas stream to the second heat engine.

* * * * *